United States Patent
Lueh et al.

(10) Patent No.: US 8,799,876 B2
(45) Date of Patent: Aug. 5, 2014

(54) METHOD AND APPARATUS FOR ASSIGNING SUBROUTINES

(75) Inventors: Guei-Yuan Lueh, San Jose, CA (US); Andrew T. Riffel, Davis, CA (US); Hong Jiang, San Jose, CA (US); Bixia Zheng, Palo Alto, CA (US); Lian Tang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1979 days.

(21) Appl. No.: 11/541,083

(22) Filed: Sep. 29, 2006

(65) Prior Publication Data
US 2008/0082970 A1 Apr. 3, 2008

(51) Int. Cl.
G06F 9/45 (2006.01)

(52) U.S. Cl.
USPC .......................................................... 717/140

(58) Field of Classification Search
None
See application file for complete search history.

(56) References Cited

U.S. PATENT DOCUMENTS

| | | | | |
|---|---|---|---|---|
| 5,555,417 A * | 9/1996 | Odnert et al. | ................. | 717/159 |
| 5,740,443 A * | 4/1998 | Carini | ............................ | 717/133 |
| 5,920,723 A * | 7/1999 | Peyton et al. | ................. | 717/157 |
| 5,923,882 A * | 7/1999 | Ho et al. | ........................ | 717/147 |
| 5,970,249 A * | 10/1999 | Holzle et al. | .................. | 717/153 |
| 6,023,582 A * | 2/2000 | Rogers et al. | ................. | 717/162 |
| 6,138,271 A * | 10/2000 | Keeley | ........................... | 717/140 |
| 7,080,366 B2 * | 7/2006 | Kramskoy et al. | ............ | 717/148 |
| 7,426,724 B2 * | 9/2008 | Kilgard et al. | ................ | 717/151 |
| 7,584,354 B2 * | 9/2009 | Graunke | ........................ | 713/167 |
| 2002/0013938 A1 * | 1/2002 | Duesterwald et al. | ............ | 717/9 |
| 2004/0003385 A1 * | 1/2004 | Kushlis | ......................... | 717/158 |
| 2005/0071856 A1 * | 3/2005 | Kumar et al. | .................. | 719/330 |

OTHER PUBLICATIONS

Kamin et al. "Jumbo: run-time code generation for Java and its applications", 2003, International Symposium on Code Generation and Optimization, 2003.*
Ewout Prangsma, "Why Java is practical for Modern Operating Systems", Jul. 2005, Libre Software Meeting 2005.*
Kurlander et al. "Minimum Cost Interprocedural Register Allocation", 1996, POPL'96.*
Barthelmann, "Inter-Task Register-Allocation for Static Operating Systems", 2002, LCTES'02-SCOPES'02.*
Pharr et al. "GPU Gems 2: Programming Techniques for High-Performance Graphics and General-Purpose Computation", Mar. 2005, Addison-Wesley Professional, Excerpt from Chapter 29.*
Necula et al., "CIL: Intermediate Language and Tools for Analysis and Transformation of C Programs", 2002, Lecture Notes in Computer Science, vol. 2304, pp. 213-228.*

* cited by examiner

*Primary Examiner* — Jue Louie
(74) *Attorney, Agent, or Firm* — Buckley, Maschoff & Talwalkar LLC

(57) ABSTRACT

According to some embodiments, systems and methods are provided to link a first entry point of a first kernel to a dummy entry, link a second entry point of a second kernel to the dummy entry, and compile the first kernel and the second kernel.

20 Claims, 5 Drawing Sheets

METHOD AND APPARATUS FOR ASSIGNING SUBROUTINES

BACKGROUND

A prevalent trend in graphics processing units is programmability. A graphics processing unit ("GPU") may include one or more processors that, amongst other tasks, may be programmed by utilizing a plurality of kernels. Each kernel may call one or more subroutines.

Subroutine calls require a calling convention to handle return addresses and registers used by the subroutine.

Many conventional methods to call subroutines require a lot of memory space and memory usage. As programming GPUs become more prevalent, and as more subroutines are used, the conventional methods of calling subroutines may create a burden on system resources.

DETAILED DESCRIPTION

The several embodiments described herein are provided solely for the purpose of illustration. Embodiments may include any currently or hereafter-known versions of the elements described herein. Therefore, persons in the art will recognize from this description that other embodiments may be practiced with various modifications and alterations.

Figure 1:
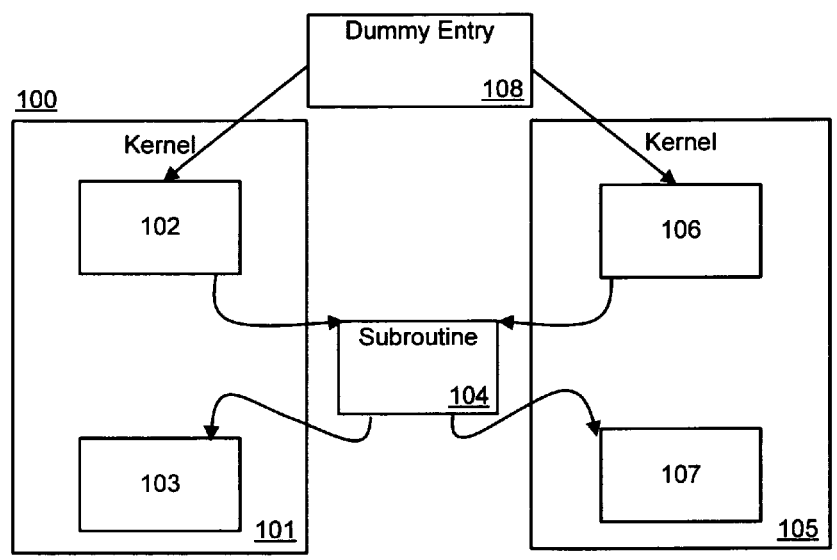
FIG. 1 illustrates a block diagram of an apparatus according to some embodiments.

Now referring to FIG. 1, an embodiment of a system 100 is shown. The system 100 may comprise a plurality of kernels 101/105, a subroutine 104, and a dummy entry 108. For ease of illustration only, FIG. 1 illustrates a first kernel 101 and a second kernel 105. Each kernel 101/105 may comprise any kernel that is or becomes known. In some embodiments, a kernel may be an object that allows hardware devices to communicate with software.

The first kernel 101 may comprise a plurality of basic blocks. For ease of illustration only a first basic block 102 and a second basic block 103 are shown. Each basic block 102/103 may comprise a sequence of instructions including a single entry point to the first instruction and a single exit point from the last instruction.

In some embodiments, the first basic block 102 may have a last instruction to call the subroutine 104. In some embodiments, the instruction to call the subroutine 104 may be a jump instruction. Calling the subroutine 104 may transfer execution control to the subroutine 104. In some embodiments, calling the subroutine 104 may be implemented by loading an address of the subroutine 104 in an instruction pointer ("IP") or IP register and saving a return address of the jump instruction in an available register.

In some embodiments, returning executive control from the subroutine 104 to the second basic block 103 may be accomplished by loading a return address of the second basic block 103 from the available register into the instruction pointer. Accordingly, the next instruction to be executed after returning from the subroutine 104 may be the first instruction in the second basic block 103. In some embodiments, the subroutine 104 may return execution control to the same basic block 102/103 that called the subroutine 104.

The second kernel 105, like the first kernel 101, may comprise a first basic block 106 and a second basic block 107. The first basic block 106 of the second kernel 105 may have a last instruction to call the subroutine 104 and execution control may be passed from the subroutine 104 to the second basic block 107 by loading a return address of the second basic block 107 from a stored location into an instruction pointer or IP register.

The dummy entry 108 may connect the first kernel 101 and the second kernel 105. In some embodiments, the dummy entry 108 may be a basic block. In some embodiments, the first kernel 101 and the second kernel 105 may be bound together by the dummy entry 109 such that the first kernel 101 and the second kernel 105 may have a new single entry point being the dummy entry 108. When each kernel 101/105 is connected to the dummy entry 108 all kernels 101/105 may be treated as a single compilation unit which will allow register usage of subroutines amongst kernels to be handled by a register allocation framework in a seamless manner. In some embodiments, the first basic block 102 may have an entry point linked to an exit point of the dummy entry 108 and the second kernel 105 may have an entry point linked to the exit point of the dummy entry 108. In some embodiments, the first kernel 101 and the second kernel 105 may be non-homogenous kernels. In some embodiments, non-homogenous kernels may be two or more kernels that are of a different nature or kind.

Figure 2:
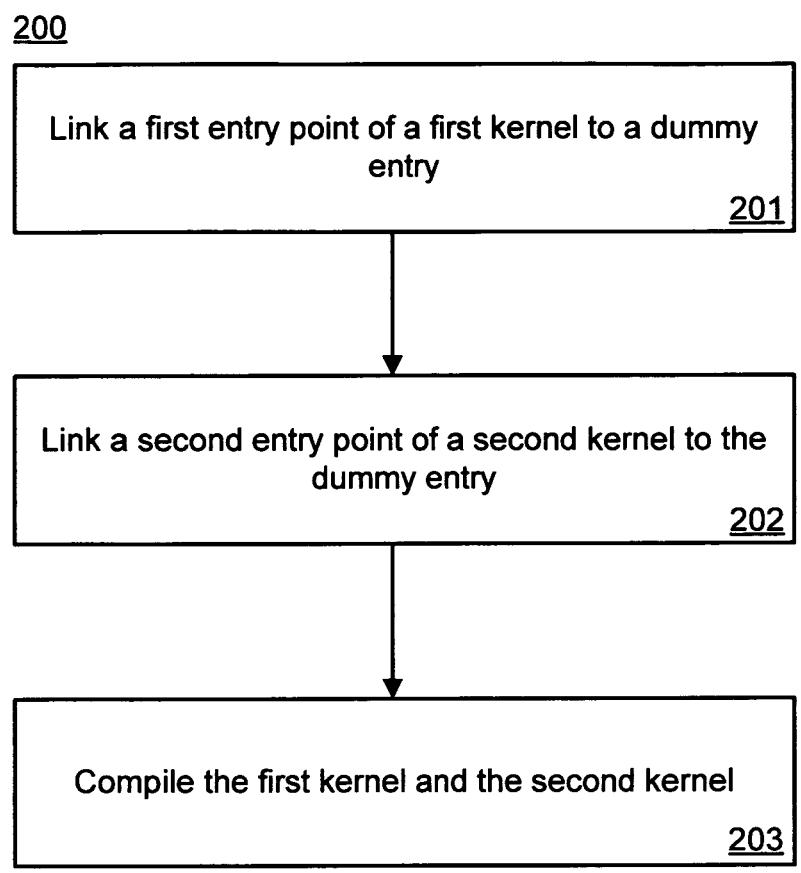
FIG. 2 is a block diagram of a process according to some embodiments.

Now referring to FIG. 2, an embodiment of a process 200 is shown. The process 200 may be executed by any combination of hardware, software, and firmware, including but not limited to, the system 100 of FIG. 1.

At 201, a first entry point of a first kernel is linked to a dummy entry and at 202, a first entry point of a second kernel is linked to the dummy entry of 201.

Next at 203, the first kernel and the second kernel may be compiled by a compiler. In some embodiments the first entry point of the first kernel and the first entry point of the second kernel are linked to the dummy entry during compilation of source code by a compiler. In some embodiments, the source code may comprise of a list of kernels. For example, the source code may comprise a list of kernels that share subroutines. The compiler may read all of the kernels and create a dummy entry or header to link all listed kernels together. From the complier's perspective, all of the kernels are now liked together by the dummy entry and may be one large kernel whose entry point is the newly created dummy entry. In some embodiments, the dummy entry may be a basic block and may have a single entry point and a single exit point.

Compiling the first kernel and second kernel with the first kernel and the second kernel pointing to the dummy entry may create a single compilation unit such that the register usage when calling subroutines is consistent in both the first kernel and the second kernel and may be handled by a register allocation framework as a single seamless object.

Figure 3:
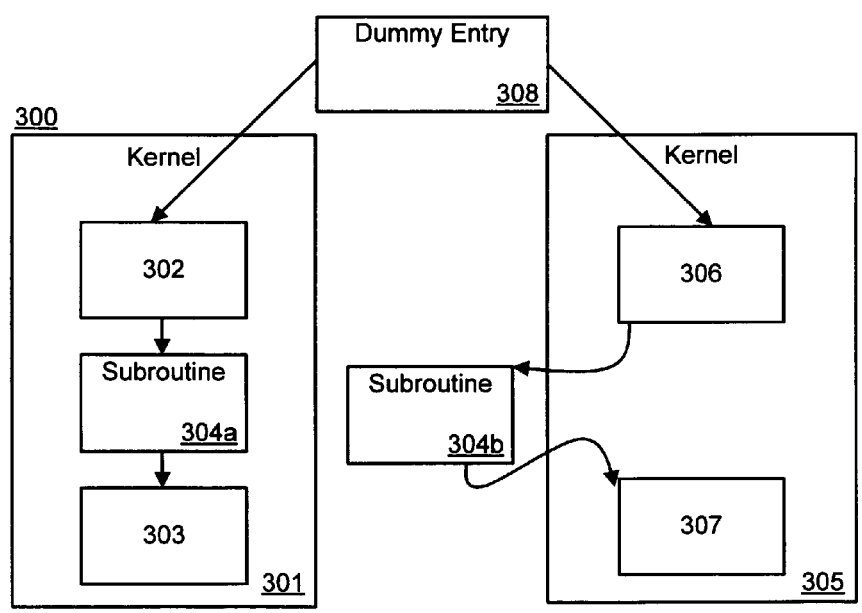
FIG. 3 illustrates a block diagram of an apparatus according to some embodiments.

Now referring to FIG. 3, an embodiment of a system 300 is shown. The system 300 may comprise a plurality of kernels 301/305, a first subroutine 304a, a second subroutine 304b and a dummy entry 308. As stated in reference to FIG. 1, the plurality of kernels may each comprise a plurality of basic blocks 302/303/306/307. In some embodiments, the first subroutine 304a may be a copy of the second subroutine 304b or vice versa. In some embodiments, the first subroutine 304a and the second subroutine 304b may be different subroutines.

While the use of subroutines may be very effective in terms of saving code space it may be costly in terms of system resources. In some embodiments, and as shown in FIG. 1, the transferring of control to and from the subroutine 104 may include a jump instruction from the first basic block 102 to the subroutine 104 and then a second jump instruction from the subroutine 104 to the second basic block 103. Besides the two jump instructions, moving a return address to an instruction pointer or IP register may cause the execution pipeline to flush out all of the instructions that were loaded into the pipeline after the move to the IP register. Gathering profiling information such as which call sites (e.g. subroutines that are jumped to or called) are on critical paths or have a higher priority, may improve kernel performance.

As stated with respect to FIG. 1, the dummy entry 308 of FIG. 3 may have a basic block format and may connect the first kernel 301 and the second kernel 305. In some embodiments, the first kernel 301 may have a first basic block 302 that includes a single entry point linked to an exit point of the dummy entry 308 and the second kernel 305 may have a first basic block 306 that includes a single entry point linked to the exit point of the dummy entry 308. In some embodiments, the first kernel 301 and the second kernel 305 may be non-homogenous kernels.

The first kernel 301 and the second kernel 302 may be ordered or ranked based on a priority of each kernel. The priority of each kernel may be based on a frequency of calling sites or jumping to subroutines. In some embodiments, the priority may be ranked from the kernel with the most number of calls or jumps to the kernel with the least number of calls or jumps. In some embodiments, kernels with higher priorities may have subroutines inlined or copied within the kernel.

For example, and referring to FIG. 1 and FIG. 3, a subroutine jump from the first kernel 101 to the subroutine 104 may occur more frequently than a subroutine jump from the second kernel to the subroutine 104. Accordingly, the first kernel 101 may have a higher priority than the second kernel 105. As illustrated in FIG. 3, the body of the first subroutine 304a may be a copy of the second subroutine 304b and may be copied as a basic block and inlined within the first kernel 301 because the first kernel 301 may have a higher priority than the second kernel 305. Inlining the first subroutine within the first kernel 301 may reduce the overhead of control transfer to and from subroutine 304. Note, however, that inlining the subroutine might only occur if creating a copy of the subroutine does not exceed an amount of available memory. In some embodiments, the memory may be an instruction cache.

Figure 4:
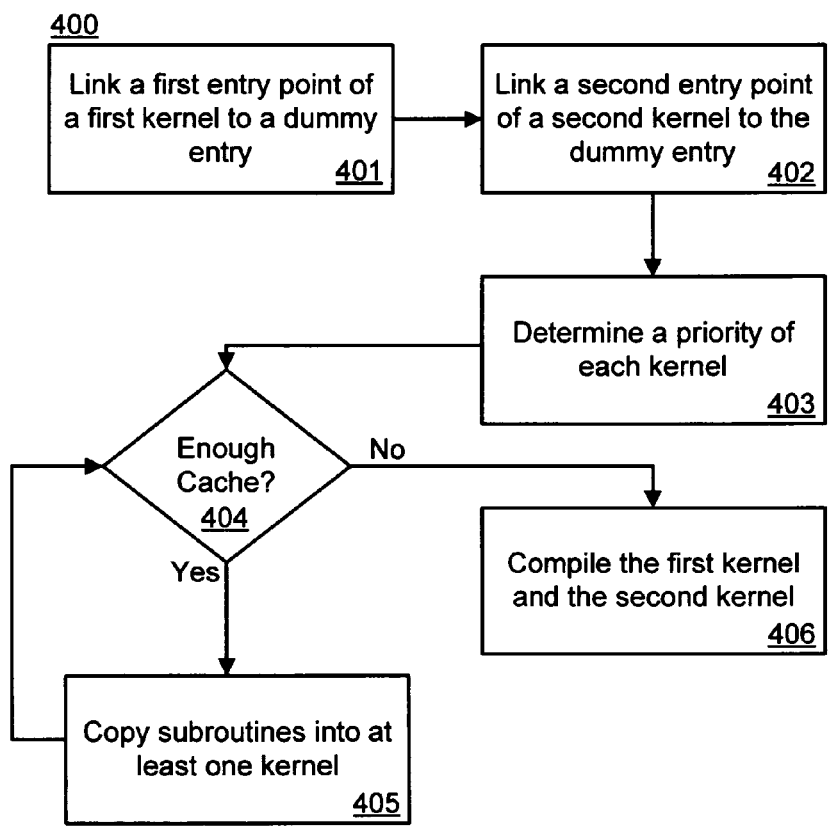
FIG. 4 is a block diagram of a process according to some embodiments.

Now referring to FIG. 4, an embodiment of a process 400 is shown. The process 400 may be executed by any combination of hardware, software, and firmware, including but not limited to, the system 200 of FIG. 2 or system 300 of FIG. 3. Some embodiments of the process 400 may balance memory usage with performance.

At 401, a first entry point of a first kernel is linked to a dummy entry. In some embodiments, the dummy entry may be a basic block and may have a single entry point and a single exit point. At 402, a first entry point of a second kernel is linked to the dummy entry of 401.

Next at 403, a priority of each kernel is determined. The priority of each kernel may be based on the number of calls to a subroutine or the number of executions of a call site. For example, if the first kernel calls a particular subroutine more than the second kernel than the first kernel may have a higher priority than the second kernel.

At 404, if enough cache is available then at 405, subroutines may be copied or inlined in at least one kernel. In some embodiments, each subroutine may comprise one or more basic blocks and kernels may be selected to have subroutines inlined based on a priority of the kernel. Kernels with higher priorities may have frequently called subroutines inlined as one or more basic blocks within each kernel. Inlining the subroutine within the kernel may reduce the overhead of control transfer to and from a non-inlined subroutine.

If an amount of cache needed to inline subroutines is not available, then at 406, the first kernel and the second kernel are compiled. Compiling the first kernel and second kernel with each pointing to the dummy entry may create a single compilation unit such that the register allocation framework can assign consistent register usages among the first kernel and the second kernel.

In some embodiments, the cache may be an instruction cache and may have a limited size or footprint. Accordingly, copying every subroutine into every kernel may be prohibitive because of the size of the cache.

For example, the first kernel may have a higher priority than the second kernel and there may only be enough cache space to inline the subroutines accessed or used by the first kernel. Therefore, the first kernel and the second kernel may be compiled with the first kernel including an inlined subroutine and the second kernel including a call to a subroutine.

Figure 5:
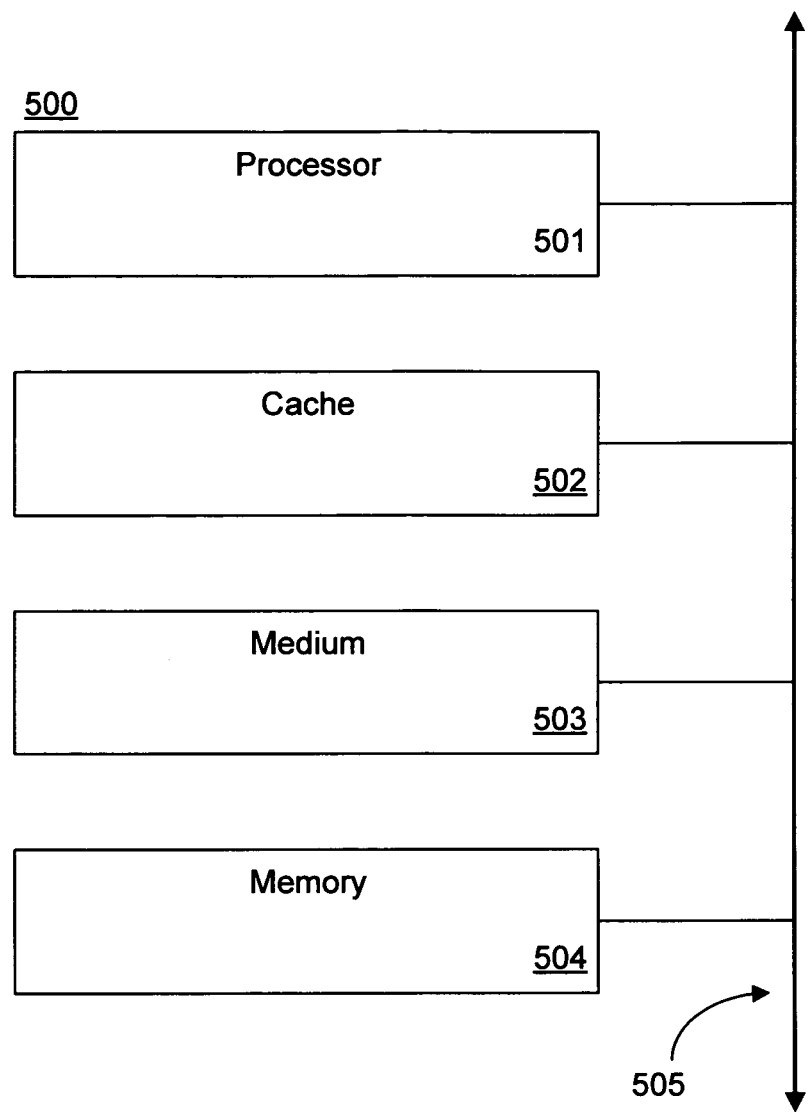
FIG. 5 illustrates a block diagram of a system according to some embodiments.

Now referring to FIG. 5, an embodiment of a system 500 is shown. The system may comprise a processor 501, a cache, 502, a memory 503, a medium 504, and a bus 505. The system 500 may comprise any electronic system, including, but not limited to, a desktop computer, a server, and a laptop computer.

The memory 503 may store, for example, applications, programs procedures, and/or modules that store instructions to be executed. The memory 503 may comprise, according to some embodiments, any type of memory for storing data, such as a Single Data Rate Random Access Memory (SDR-RAM), a Double Data Rate Random Access Memory (DDR-RAM), or a Programmable Read Only Memory (PROM).

The processor 501 may comprise any integrated circuit that is or becomes known and may include or otherwise be associated with dedicated registers, stacks, queues, etc. that are used to execute program code and/or one or more of these elements may be shared there between. The processor 501 may be capable of running multiple threads of execution called kernels. Each kernel may include, may access or may be associated with one or more subroutines. In some embodiments, the processor 501 may be an array of processors.

The cache 502 may comprise any cache that is or becomes known. In some embodiments, the cache may be instruction cache ("I-cache"). The cache 502 may contain one or more kernels and one or more subroutines. Since calling individual subroutines may be hindered by cache latency, each kernel may require each subroutine to reside within each kernel to avoid the cache latency. Multiple kernels may access data from register files and instruction fetches located in the cache 502 or a hierarchy of cache 502 shared by an array of processors 501 and the kernels associated with these processors 501.

Calls to a subroutine may require a calling convention to manage a return address used by the subroutine. Each kernel that shares a subroutine may have to abide by a register allocation usage decision of the subroutine. In some embodiments, a target subroutine call may save a return address in an available register and may jump to a label of the target subroutine. Upon returning from the target subroutine, the return address may be restored or moved into the available register. In some embodiments, a calling convention may not be available to save and restore permanent registers, and thus subroutine calls may be jump instructions.

The medium 504 may be any storage medium, such as, but not limited to, magnetic media, optical media, flash memory, and non-volatile memory. The medium 504 may store instructions adapted to be executed by the processor 501 to perform a method.

The foregoing disclosure has been described with reference to specific exemplary embodiments thereof. It will, however, be evident that various modifications and changes may be made thereto without departing from the broader spirit and scope set forth in the appended claims.

What is claimed is:

1. A method comprising:
    linking a single first entry point of a first kernel to a dummy entry having a single entry point and a single exit point, the first kernel comprising a sequence of instructions including the single first entry point to a first instruction of the sequence of instructions and a single first exit point from a last instruction of the sequence of instructions;
    linking a single second entry point of a second kernel to the dummy entry, the second kernel comprising a second sequence of instructions including the single second entry point to a first instruction of the second sequence of instructions and a single second exit point from a last instruction of the second sequence of instructions, the single entry point of the dummy entry being a new single entry point for the first kernel and the second kernel; and
    compiling the first kernel and the second kernel to link the single first entry point of the first kernel and the single second entry point of the second kernel to the dummy entry to create a single compilation unit including the first kernel and the second kernel that permits seamless register usage of subroutines amongst the first and second kernels by a register allocation framework, the single first entry point of the first kernel and the single second entry point of the second kernel being linked to the single exit point of the dummy entry and the entry point of the compilation unit being the single entry point of the dummy entry.

2. The method of claim 1, further comprising:
    inlining a subroutine in the first kernel.

3. The method of claim 1, wherein the first kernel has a higher priority than the second kernel.

4. The system of claim 3, where priority is based on a number of executed call sites.

5. The system of claim 3, wherein the first kernel and the second kernel are compiled in order of priority.

6. The method of claim 1, wherein the first kernel is to call a subroutine and the second kernel is to call the subroutine.

7. The method of claim 1, wherein the first kernel and the second kernel are compiled at the same time.

8. The method of claim 1, wherein the first kernel and the second kernel are non-homogenous.

9. A non-transitory medium storing instructions adapted to be executed by a processor to perform a method, the method comprising:
    linking a single first entry point of a first kernel to a dummy entry having a single entry point and a single exit point, the first kernel comprising a sequence of instructions including the single first entry point to a first instruction of the sequence of instructions and a single first exit point from a last instruction of the sequence of instructions;
    linking a single second entry point of a second kernel to the dummy entry, the second kernel comprising a second sequence of instructions including the single second entry point to a first instruction of the second sequence of instructions and a single second exit point from a last instruction of the second sequence of instructions, the single entry point of the dummy entry being a new single entry point for the first kernel and the second kernel; and
    compiling the first kernel and the second kernel to link the single first entry point of the first kernel and the single second entry point of the second kernel to the dummy entry to create a single compilation unit including the first kernel and the second kernel that permits seamless register usage of subroutines amongst the first and second kernels by a register allocation framework, the single first entry point of the first kernel and the single second entry point of the second kernel being linked to the single exit point of the dummy entry and the entry point of the compilation unit being the single entry point of the dummy entry.

10. The non-transitory medium of claim 9, wherein a subroutine is inlined within the first kernel.

11. The non-transitory medium of claim 9, wherein the first kernel has a higher priority than the second kernel.

12. The non-transitory medium of claim 11, where priority is based on a number of executed call sites.

13. The non-transitory medium of claim 12, wherein the first kernel and the second kernel are to be compiled in order of priority.

14. The non-transitory medium of claim 9, wherein the first kernel is to call a subroutine and the second kernel is to call the subroutine.

15. The non-transitory medium of claim 9, wherein the first kernel and the second kernel are to be compiled at the same time.

16. The non-transitory medium of claim 9, wherein the first kernel and the second kernel are non-homogenous.

17. A system comprising:
    a double data rate memory module;
    a processor; and
    a medium storing instructions adapted to be executed by a processor to perform a method, the method comprising:
        linking a single first entry point of a first kernel to a dummy entry having a single entry point and a single exit point, the first kernel comprising a sequence of instructions including the single first entry point to a first instruction of the sequence of instructions and a single first exit point from a last instruction of the sequence of instructions;
        linking a single second entry point of a second kernel to the dummy entry, the second kernel comprising a second sequence of instructions including the single second entry point to a first instruction of the second sequence of instructions and a single second exit point from a last instruction of the second sequence of instructions, the single entry point of the dummy entry being a new single entry point for the first kernel and the second kernel; and
        compiling the first kernel and the second kernel to link the single first entry point of the first kernel and the single second entry point of the second kernel to the dummy entry to create a single compilation unit including the first kernel and the second kernel that permits seamless register usage of subroutines amongst the first and second kernels by a register allocation framework, the single first entry point of the first kernel and the single second entry point of the second kernel being linked to the single exit point of the dummy entry and the entry point of the compilation unit being the single entry point of the dummy entry.

18. The system of claim 17, wherein the first kernel has a higher priority than the second kernel.

19. The system of claim 18, where priority is based on a number of executed call sites.

20. The system of claim 17, wherein the first kernel and the second kernel are compiled in order of priority.

* * * * *